United States Patent [19]

Spence et al.

[11] 3,898,480

[45] Aug. 5, 1975

[54] MULTIPHASE LOGIC CIRCUIT

[75] Inventors: John R. Spence, Villa Park; Bruce W. Kinney, Jr., Anaheim, both of Calif.

[73] Assignee: Rockwell International Corporation, El Segundo, Calif.

[22] Filed: Apr. 4, 1974

[21] Appl. No.: 457,956

[52] U.S. Cl. .............. 307/221 C; 307/205; 307/214; 307/279; 328/37

[51] Int. Cl.² .................... H03K 19/08; G11C 19/28

[58] Field of Search ............ 307/221 R, 221 C, 205, 307/214, 279; 328/37

[56] References Cited

UNITED STATES PATENTS

| | | | |
|---|---|---|---|
| 3,393,325 | 7/1968 | Borror et al. | 307/214 X |
| 3,536,936 | 10/1970 | Rubinstein et al. | 307/279 X |
| 3,590,273 | 6/1971 | Jarvis | 307/221 C |
| 3,643,106 | 2/1972 | Berwin et al. | 307/221 C |

*Primary Examiner*—John Zazworsky
*Attorney, Agent, or Firm*—H. Fredrick Hamann; G. Donald Weber, Jr.; Morland Charles Fischer

[57] ABSTRACT

Multiple phase logic circuitry forming a multi-bit output shift register in a MOS integrated circuit chip, the register providing serial or parallel output of binary data. A first gating circuit, controlled by a first control signal, parallel loads data into the register bit positions. A second gating circuit, controlled by a second control signal, operates to either transfer the data from the register in parallel or to shift the data out serially. Simultaneously with the loading of data into each bit position, the first gating circuit disables the binary output of the logic gate preceeding each bit position. In this manner the preceeding logic gate binary output does not affect the data loaded into the bit position.

12 Claims, 2 Drawing Figures

MULTIPHASE LOGIC CIRCUIT

BACKGROUND OF THE INVENTION

1. Field of the Invention

This invention relates generally to gating circuits and, more particularly, to multiphase gating circuits for implementing a variety of logical functions.

2. Description of the Prior Art

U.S. Pat. No. 3,526,783 (issued Sept. 1, 1970, to Robert K. Booher for "Multiphase Gate Usable in Multiple Phase Gating Systems") shows and describes gating circuits of the four-phase type for performing prescribed logical functions by periodically charging and discharging selected circuit capacitances. The basic logic gate in such circuits typically comprises three MOS transistors, or their equivalents, identified as precharge, logic, and isolation transistors. The source-drain paths of the precharge and logic transistors are connected between a voltage source and a common node, and the isolation transistor source-drain path is connected between the common node and the output node of the logic gate. The output node is precharged during a first time interval to a first binary voltage level. Input signals are applied to the control electrode of the logic transistor to selectively discharge the output node therethrough to a second binary voltage level during a second time interval. A plurality of series and/or parallel connected logic transistors may be provided as a logic network with the resulting output signal representing the logic function performed by the logic network.

In more complex arrangements, a plurality of logic gates are interconnected to form registers, counters, adders, and the like. For example, shift registers are typically formed by series connecting a plurality of logic gates. Each cell of the register (providing storage of one data bit) includes a pair of series-connected logic gates. Data is shifted sequentially through each gate of the pair from the input to the output of each cell during the course of the four-phase clock signal intervals. During the first and second phase intervals the input data is shifted and inverted by the first logic gate of the pair and is thereafter again shifted and inverted by the second logic gate during the third and fourth phase intervals. Thus, at the conclusion of the four phase cycle, the original input date is supplied uninverted at the output of the second gate.

MOS/LSI integrated circuit chips incorporating multiphase gating circuitry and shift register arrangements have found widespread application in the control and operation of electronic desk-top and hand-held calculators. Typically, the results of a calculating operation are loaded into an output shift register of the chip and subsequently transferred to the calculator read-out device for observation by the operator. In view of the many different types of read-out devices being developed for such calculators, it has been proposed in the past to employ an output shift register having a parallel-in and both a parallel-out or a serial-out capability. Thus, in the case of a light emitting diode (LED) display, data has been transferred in parallel from the shift register directly to the individual LED drivers. For liquid crystal displays (LCD) or thermal printers, however, the data is shifted serially out of the register and is fed to another circuit chip for operating the LCD or printer.

This prior shift register required four metallization lines and additional logic elements for controlling the operation thereof. As a result the register occupies a relatively large area of the MOS chip. One metallization line is employed to control parallel input gating circuitry which parallel loads the binary data, another line controls parallel output gating circuitry for transferring the data from the register in parallel, while two additional lines control the shifting of data through the register. Moreover, within each cell of the register, shifting is prevented during parallel loading by turning off a shift transistor in series with the logic transistor of one of the pair of logic gates. Thus, the shift transistors are turned off at the time the parallel input gating devices for loading data are turned on. As a result, the complement of the input load command signal must be developed to control the shift transistors. Additional logic devices and chip area are required to provide this complemented signal.

SUMMARY OF THE INVENTION

The present invention resides in a logic gate including a first logic network for selectively discharging an output node of the logic gate in response to input logic signals at an input node thereof and first gating means for disabling the first logic network by discharging the input node. With the first logic network disabled, a second logic network is connected through second gating means to selectively discharge the output node whereby the voltage level at the output node is established by the second logic network. With this arrangement, the first and second gating means can be enabled together and, for this purpose, a common control line is connected to the first and second gating means to control the operation thereof. In this manner, the need for separate control lines providing complementary control signals is eliminated thus reducing the number of devices and the chip area required by the logic gate.

In a preferred form the logic gate is incorporated in a multicell shift register arrangement, one bit per cell, in which each cell comprises a pair of logic gates. Parallel loading of data into each register cell is effected by the first and second gating means connected to one gate of each cell, with the common input control line connected to control the first and second gating means of each cell.

Serial or parallel output of data from the shift register is achieved by connecting the output node of each cell to the input node of a succeeding cell and, through an isolation device, to a respective parallel output gating circuit, one per cell. The register is controlled by multiple phase clock signals which operate to propagate the stored data bits serially through the register. A common output control line is connected to the parallel output gating circuits and to third gating means for discharging the output node of each cell. For parallel output, an output control signal on the common output control line enables the parallel output gating circuits to effect parallel transfer of the data bits and, simultaneously, discharges the output nodes through the third gating means to prevent the serial propagation of the data bits. As a result only two control lines are required to control the loading and the parallel or serial transfer of data with a resulting decrease in the chip area for implementing the register.

In an alternative embodiment, the parallel output circuits and the third gating means are controlled independently to provide serial output only, parallel output only, or simultaneous serial and parallel output.

DESCRIPTION OF A PREFERRED EMBODIMENT

Figure 1:
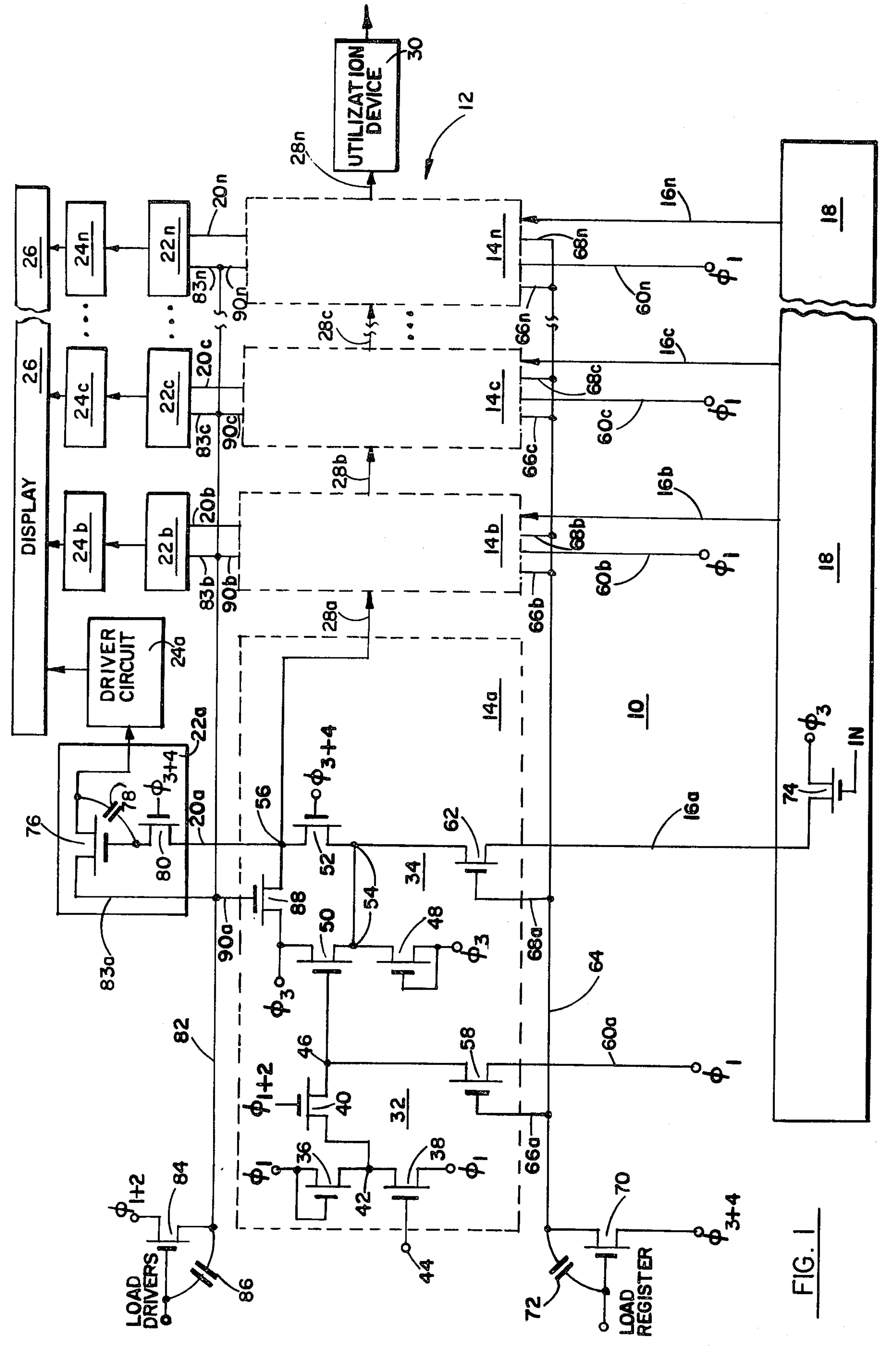
FIG. 1 is an electrical schematic diagram of a logic gating circuit in accordance with the present invention.

As shown in the drawings for purposes of illustration and, in particular, FIG. 1 thereof, the present invention is embodied in a logic circuit 10 including a multibit shift register 12 including a plurality of serially connected register cells 14*a*, 14*b*, 14*c*, . . . 14*n*, each cell providing one bit position of the register for storage of binary data thereat. A plurality of parallel input lines 16*a*, 16*b*, 16*c*, . . . 16*n* are connected, one each, between a logic array 18 and the respective register cells of register 12 to provide parallel loading of binary data bits from the logic array into the cells. A plurality of parallel output lines 20*a*, 20*b*, 20*c*, . . . 20*n* are connected, one each, between the register cells and a corresponding plurality of parallel output gating circuits 22*a*, 22*b*, 22*c*, . . . 22*n* to provide for the parallel output of binary data from the register. In one application, the parallel output gating circuits are connected through respective driver circuits 24*a* . . . 24*n* to a display 26, which may be of a known light emitting diode type. The register cells are serially connected by output lines 28*a*, 28*b*, 28*c*, . . . 28*n*. Serially shifted output of binary data bits is provided from the final register cell 14*n* over line 28*n* to a utilization device 30. Typically, device 30 may be connected to external circuitry for operating other forms of readout devices, or displays.

Figure 2:
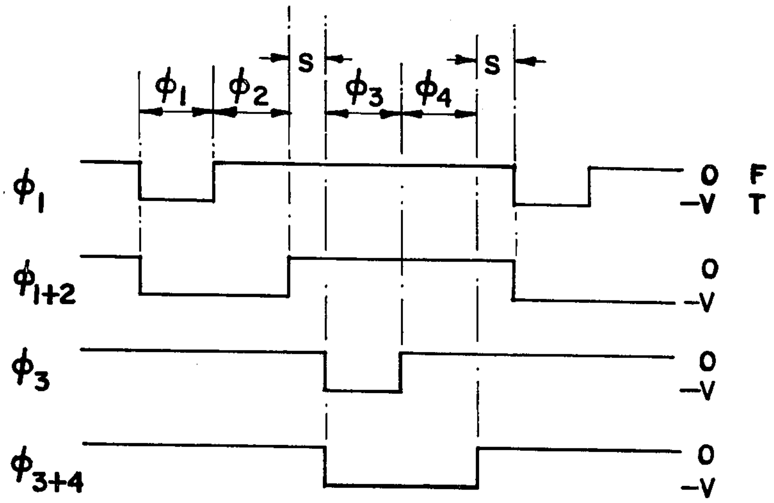
FIG. 2 is a diagram of the four-phase clock signals for operating the circuit of FIG. 1.

The four-phase clock signals provided during each operating cycle of the logic circuit 10 are illustrated in FIG. 2. The operating cycle is divided into four phase intervals $O_1$, $O_2$, $O_3$ and $O_4$ with there being a phase separation S between intervals $O_4$ and $O_1$ and between intervals $O_2$ and $O_3$. Clock signals $O_1$, $O_{1+2}$, $O_3$ and $O_{3+4}$ switch between binary true and false voltage levels. By the convention adopted herein, a zero voltage level (ground) is designated binary zero or false while a negative voltage level is designated binary one or true. Thus, as illustrated in FIG. 2, the $O_1$ clock signal is true (negative) during the $O_1$ interval and is false (ground) at the remaining intervals of the operating cycle. Similarly, clock signal $O_{1+2}$ is true only during intervals of $O_1$ and $O_2$, clock signal $O_3$ is true during $O_3$, and clock signal $O_{3+4}$ is true during intervals $O_3$ and $O_4$.

The shift register cells 14*a* . . . *n* are identical in structure and operation, and for this reason, only cell 14*a* is illustrated and described in detail. Register cell 14*a* includes a first multiple phase logic gate 32 and a second multiple phase logic gate 34. Logic gate 32 comprises a precharge transistor 36, a logic transistor 38, and an isolation transistor 40. The source-drain conduction paths of the precharge and logic transistors, 36 and 38 respectively, are connected in parallel between a common node 42 and a $O_1$ clock signal voltage source. The control (gate) electrode of the precharge transistor 36 also receives the $O_1$ clock signal. The control electrode of logic transistor 38 is connected to input node 44 of the logic gate 32 to receive logic signals from a preceding circuit (not shown). Isolation transistor 40 is connected between node 42 and output node 46 of the logic gate 32. The control electrode of the isolation transistor is connected to receive the $O_{1+2}$ clock signal.

Logic gate 34 comprises a precharge transistor 48, a logic transistor 50, and an isolation transistor 52, which are coupled in a similar fashion to the corresponding transistors in logic gate 32. However, the precharge and logic transistors 48 and 50, respectively, are connected in parallel between a common node 54 and the $O_3$ clock signal voltage source. The control electrode of the precharge transistor 48 also receives the $O_3$ clock signal. The control electrode of logic transistor 50 is connected to node 46 to receive the output signals from logic gate 32. Thus, node 46 functions as the output node for logic gate 32 and as the input node for logic gate 34. Isolation transistor 52 is connected between node 54 and output node 56 of logic gate 34. The control electrode of isolation transistor 52 is connected to receive the $O_{3+4}$ clock signal.

Considering the operation of only the basic three transistor logic gate structure at this point, during $O_1$ precharge transistor 36 and isolation transistor 40 are both rendered conductive by the clock signals at their control electrodes. Node 46 is precharged through these two transistors to the negative (binary one) voltage of the $O_1$ clock signal. During $O_2$, the isolation transistor 40 remains conductive. However, the $O_1$ clock signal switches to ground potential (binary zero) whereby transistor 36 is non-conductive. In addition, a ground potential signal is supplied to the source-drain path of transistor 38. Depending upon the input signal level supplied to the logic transistor 38 at input node 44, node 46 is selectively discharged to ground through isolation transistor 40 and logic transistor 38. That is, if the input signal is negative (binary one), the logic transistor 38 is turned on and the discharge path to ground is completed to establish a ground (binary zero) level at output node 46. Conversely, if the input signal is zero (binary zero), logic transistor 38 is held off and node 46 remains charged to a negative level (binary one). Whichever binary level is established at node 46 is then available thereafter during $O_3$ and $O_4$ as an input to logic gate 34.

Logic gate 34 operates similarly but during a later portion of the operating cycle. Thus, during $O_3$ output node 56 is precharged through precharge transistor 48 and isolation transistor 52 to the negative (binary one) level of the $O_3$ clock signal. During $O_4$, the $O_3$ clock signal returns to ground and output node 56 is selectively discharged to ground along the series path through isolation transistor 52 and logic transistor 50, depending upon the on or off condition of the logic transistor. If the input signal at node 46 from the prior logic gate 32 is negative, logic transistor 50 conducts to discharge output node 56 to ground. If the input signal is zero, logic transistor 50 is held off and output node 56 remains precharged to a negative level. Whichever binary level is established at output node 56 is thereafter available during $O_1$ and $O_2$ as an input signal (over line 28*a*) to the first logic gate (not shown) of the succeeding register cell 14*b*. The first logic gate in cell 14*b* is identical to logic gate 32 in cell 14*a*.

It should be noted that each of logic gates 32 and 34 functions as an inverter so that the input signal to the register cell 14*a* is twice inverted during the four phase cycle and is supplied uninverted as an output signal from the register cell at output node 56.

All transistors, in the preferred embodiment, are of the P-channel, enhancement mode, insulated-gate field effect (IGFET) type. However, it will be understood that other types of switching devices, such as N-channel IGFETS could be employed. In addition, other arrangements of logic gates 32 and 34, as shown, for example, in the previously referenced patent may be employed. For example, in logic gate 32, isolation transistor 40 could be disposed in series between node 42 and logic transistor 38, with node 42 then directly connected to the input of logic gate 44.

In accordance with the present invention, a first gating transistor 58 has the source-drain path thereof connected between node 46 and a source of reference voltage shown as the $O_1$ clock signal voltage source. Gating transistor 58 discharges node 46 along path 60*a* to disable the logic transistor 50 of logic gate 34. In addition, a second gating transistor 62 is connected via line 16*a* between logic array 18 and node 54 of logic gate 34 to transmit binary data from the logic array into the register cell 14*a*. A common input control line 64 is provided for the gating transistors 58 and 62 and the respective control electrodes 66*a* and 68*a* of these transistors are connected to the input control line 64. Corresponding gating transistors 58*b* . . . 58*n* and 62*b* . . . 62*n* (not shown) are provided in the remaining register cells 14*b* . . . 14*n* connected to the input control line 64. Corresponding control electrode connections 66*b* . . . 66*n* and 68*b* . . . 68*n* as well as paths 60*b* . . . 60*n* and 16*b* . . . 16*n* for the remaining cells are identified in FIG. 1.

The input control signal for loading the register cells is provided on input control line 64 by a driver transistor 70 having a bootstrap capacitor 72 connected between the output and gate electrode thereof and $O_{3+4}$ clock signal source connected to the remaining electrode thereof. When the register is to be loaded a negative load register signal is applied to the gate electrode of driver transistor 70. The negative signal turns on the driver transistor and during $O_{3+4}$ the $O_{3+4}$ clock signal switches negative to provide a negative input control signal through conductive driver transistor 70 to input control line 64. The input control signal approaches the full negative level of the $O_{3+4}$ clock signal due to the known feedback operation of bootstrap capacitor 72.

If no load register signal is applied to the gate electrode of driver transistor 70, the driver transistor is held off and the negative $O_{3+4}$ clock signal remains isolated from the input control line 64. As a result, the gating transistors 58 and 62 are held off.

Logic array 18 provides the data bits to be loaded into the shift register cells 14*a* . . . 14*n*. In the case of a calculator application, the data bits may represent information to be displayed or read-out to an operator, and the data may take various known forms such as binary-coded-decimal (BCD), seven-segment decoded (for seven-segment displays), and the like. A logic transistor 74 is shown as part of the logic array 18 and is connected between input line 16*a* and the $O_3$ clock voltage source for furnishing the data bit to be loaded into register cell 14*a* (i.e. into logic gate 34). The logic transistor 74 operates to selectively discharge the output node 56 of logic gate 34 to ground (the $O_3$ clock signal is at ground during interval $O_4$) as a function of the input signal supplied to the control electrode of transistor 74.

In order to load the register, the load register signal is applied to the gate electrode of driver transistor 70 and is boosted onto input control line 64 during intervals $O_3$ and $O_4$ thereby turning on the first gating transistor 58 and the second gating transistor 62. Since the $O_1$ clock signal supplied to the first gating transistor 58 is at ground during intervals $O_3$ and $O_4$, the voltage level at node 46 is forced to ground through transistor 58 via line 60*a*. As a result, logic transistor 50 is held off by grounding its control electrode to prevent a prior negative level at the control electrode thereof from affecting the output level to be established at output node 56. Also, during interval $O_3$, the output node 56 is precharged to the negative level of the $O_3$ clock signal through precharge transistor 48 and isolation transistor 52. Since the second gating transistor 62 is conductive during $O_{3+4}$, the input line 16*a* connected to logic transistor 74 is similarly precharged through precharge transistor 48 and second gating transistor 62.

During interval $O_4$ the input voltage at node 46 remains clamped to ground through first gating transistor 58 so that logic transistor 50 remains disabled. Logic transistor 74, however, will either be conductive or not during interval $O_4$ depending on its control electrode voltage and will, thus, either turn on to provide a discharge path to ground (binary zero) for output node 56 or will remain off so that output node 56 remains charged negative (binary one). Thus, logic transistor 74 is, in effect, connected in parallel with logic transistor 50 and both function to selectively discharge output node 56. The first and second gating transistors, 58 and 62, for respectively disabling logic transistor 50 and connecting logic transistor 74 are advantageously connected to the common input control line 64 and are operated by a common input control signal.

The parallel output gating circuit 22*a* comprises a driver transistor 76 having a bootstrap capacitor 78 connected between the output and gate electrodes thereof in a known manner. The gate electrode thereof is further connected through an isolation transistor 80 via output line 20*a* to the output node 56 of logic gate 34. The isolation transistor is turned on by the $O_{3+4}$ clock signal supplied to the control electrode thereof. The remaining electrode of driver transistor 76 is connected to an output control line 82 via line 83*a*.

An output control signal for loading the driver circuits 22*a* . . . 22*n* in parallel is supplied during intervals $O_1$ and $O_2$ to output control line 82 through a driver transistor 84 having a bootstrap capacitor 86 connected across the output and gate electrodes thereof and receiving the $O_{1+2}$ clock signal on its remaining electrode. When a negative load driver signal is present on the gate electrode of driver transistor 84, the driver transistor is turned on and the negative $O_{1+2}$ clock signal is coupled to output control line 82 during intervals $O_1$ and $O_2$. If no load driver signal is supplied, the driver transistor remains off and the $O_{1+2}$ clock signal is isolated from output control line 82.

During the $0_3$ precharge and the $0_4$ selective discharge intervals for output node 56 of logic gate 34, the isolation transistor 80 is turned on the $0_{3+4}$ clock signal at the control electrode thereof. As a result, the voltage level established by the selective discharge operation of output node 56 is also established at the gate electrode of driver transistor 76. After intervals $0_3$ and $0_4$, the isolation transistor 80 turns off when the $0_{3+4}$ signal at the control electrode thereof returns to ground, thereby isolating the gate electrode of driver transistor 76 at the binary level of the data bit established at output node 56.

Subsequently, during intervals $0_1$ and $0_2$, if an output control signal is provided on output control line 82, the binary level established at the gate electrode of driver transistor 76 is supplied as an output data bit to the output driver circuits 24*a* . . . 24*n*. If a negative level is established at the gate electrode of driver transistor 76, transistor 76 is turned on thereby, and the negative (binary one) level on line 82 is coupled therethrough to the driver circuit. Conversely, if a ground level is established at the gate electrode of driver transistor 76, transistor 76 is held off, and the negative level on line 82 is isolated from the driver circuit.

In order to clear the data bit represented by the voltage level at output node 56 from the register cell 14a and prevent its being shifted serially out of the register during intervals $0_1$ and $0_2$ at the same time that it is being transferred to the driver circuit 22a in parallel, a third gating transistor 88 is connected between output node 56 and the $0_3$ clock signal source. Moreover, the control electrode of third gating transistor 88 is connected via line 90a to the output control line 82. Thus, during intervals $0_1$ and $0_2$, if a negative output control signal is present on output control line 82 to effect parallel output of the data bits stored in the register, then the third gating transistor is turned on to connect the output node 56 to ground (the $0_3$ clock signal is at ground during intervals $0_1$ and $0_2$). By forcing the corresponding output nodes in the remaining register cells to ground in this manner, the register is cleared and the serial shifting of the stored data bits is prevented. It should be noted that grounding the output node 56 in this fashion during intervals $0_1$ and $0_2$ does not affect the parallel output signal being supplied to the driver circuit 22*a* at the gate electrode of driver transistor 76 since the isolation transistor 80 is off during intervals $0_1$ and $0_2$ to isolate output node 56 from the output gating circuit 22*a*.

It is desired to provide simultaneous parallel output and serial output of stored data bits, in accordance with a modification of the present invention, the control electrode of third gating transistor 88 is disconnected from output control line 82 by breaking line 90*a* and a separate control signal source (not shown) is connected to the control electrode of the third gating transistor 88 during $0_{1+2}$ for clearing the register cell. If the separate control signal is ground, the third gating transistor 88 is held off to prevent discharge of the output node 56 so that the data bit at the output node is propagated serially out of the register as well as being transferred out in parallel. Conversely, a negative control signal during $0_{1+2}$ will turn on the third gating transistor 88 to discharge the output node thereby clearing the register cell.

It will be evident that while a preferred embodiment has been illustrated and described, various changes and modifications may be made without departing from the spirit and scope of the invention.

We claim:

1. A logic circuit comprising:

an input node;

an output node;

first gate means;

second gate means;

said second gate means including first precharge means for setting said output node to a first voltage level;

said second gate means further including first logic means for selectively discharging said output node to a second voltage level in response to first input logic signal levels at said input node, said first logic means having a control electrode connected to said input node;

second logic means connected in parallel with said first logic means for selectively dicharging said output node;

said first gate means connected to said control electrode of said first logic means for disabling said first logic means;

said second gate means connecting said second logic means to said output node; and a common input control line connected to said first and said second gate means for controlling the operation thereof.

2. The logic circuit of claim 1 wherein said first and second gate means include, respectively, first and second gating devices enabled by control signals supplied to a control electrode thereof from said common control line, said first gate means, when enabled, supplying a potential to the control electrode of said first logic means to prevent discharge of said output node by said first logic means, whereby said second logic means control the selective discharge of said output node without interference from said first logic means.

3. The logic circuit of claim 2 further including:

means for supplying said control signals to the control electrodes of said first and second gating devices during a first portion of an operating cycle;

a third gating device for discharging said output node, said third gating device being enabled by a signal supplied to a control electrode thereof; and means for supplying the signal to said control electrode of said third gating device during a second portion of said operating cycle.

4. The logic circuit of claim 3 further including;

an output gating circuit operative during said second portion of said operating cycle;

isolation means for connecting said output node to said output gating circuit during said first portion of said operating cycle to supply the output voltage signal established by the selective discharge of said output node to said output gating circuit; and an output control line connected to said output gating circuit for controlling operation thereof.

5. The logic circuit of claim 4 wherein said output control line is connected to said control electrode of said third gating device.

6. The logic circuit of claim 1, wherein said first gate means includes:

second precharge means for setting said input node to said first voltage level;

third logic means adapted to selectively discharge said input node to said second voltage level in response to second input logic signal levels applied to a control electrode of said third logic means;

said second precharge means and said third logic means electrically connected in parallel with respect to one another between a common terminal thereof and a source of reference voltage;

means for connecting said source of reference voltage to a control electrode of said second precharge means.

7. The logic circuit of claim 6, further including isolation means connecting said third logic means to said input node during said second portion of said operating cycle.

8. The logic circuit of claim 6, wherein said first, second and third logic means and said first and second precharge means are p-channel insulated gate field effect transistors.

9. In combination:

a shift register comprising a plurality of register cells, each cell adapted to store a bit of binary data;

means connecting said register cells in serial fashion for propagating the stored bits of binary data serially through the register;

input gate means for loading binary data into respective cells of the register;

output gate means connected to respective cells of the register for transferring binary data in parallel from the register; and discharge means for clearing said binary data from said register cells in order to prevent the serial propagation thereof.

10. The combination of claim 9 further including;

a common control line connected to said output gate means and to said discharge means for controlling operation thereof, whereby said stored binary data is cleared by said discharge means to prevent serial propagation thereof during said parallel data transfer.

11. The combination of claim 10 wherein each of said register cells includes a logic gate having input and output nodes and a first logic network for setting the output voltage level at said output node in response to input voltage levels at said input node;

said input gate means includes first gate means connected to said input node for clamping said input node to a given voltage level for disabling said first logic network and second gate means for connecting a second logic network to said output node for setting the output voltage level thereat without interference from said first logic network; and a common line connected to said first and said second gate means for controlling the operation thereof.

12. A ratioless logic circuit comprising:

an input terminal;

an output terminal;

a source of first and second reference voltages;

precharge means for setting said output terminal to said first reference voltage, a control electrode thereof connected to said source of reference voltages;

isolation means adapted to connect said precharge means to said output terminal during a first portion of an operating cycle;

gating means connected to said output terminal and adapted to discharge said output terminal to said second reference voltage in response to a control signal applied to a control electrode thereof;

logic means having a control electrode thereof connected said input terminal and adapted to discharge said output terminal to said second reference voltage in response to an input logic level signal applied to said input terminal;

said precharge means and said logic means electrically connected in parallel with respect to each other between a common terminal thereof and said source of reference voltages, and means for supplying said control signal to said gating means control electrode during a second portion of said operating cycle to thereby enable said gating means and discharge said output node.

* * * * *